United States Patent
Asano et al.

(10) Patent No.: US 11,909,266 B2
(45) Date of Patent: Feb. 20, 2024

(54) ROTOR, AND ROTARY ELECTRIC MACHINE PROVIDED WITH SAME

(71) Applicants: DAIKIN INDUSTRIES, LTD., Osaka (JP); UNIVERSITY PUBLIC CORPORATION OSAKA, Osaka (JP)

(72) Inventors: Yoshinari Asano, Osaka (JP); Yoshihito Sanga, Osaka (JP); Masayuki Sanada, Sakai (JP); Shigeo Morimoto, Sakai (JP); Yukinori Inoue, Sakai (JP)

(73) Assignees: Daikin Industries, Ltd., Osaka (JP); UNIVERSITY PUBLIC CORPORATION OSAKA, Osaka (JP)

( * ) Notice: Subject to any disclaimer, the term of this patent is extended or adjusted under 35 U.S.C. 154(b) by 410 days.

(21) Appl. No.: 17/321,028

(22) Filed: May 14, 2021

(65) Prior Publication Data
US 2021/0273503 A1     Sep. 2, 2021

Related U.S. Application Data

(63) Continuation of application No. PCT/JP2019/043394, filed on Nov. 6, 2019.

(30) Foreign Application Priority Data

Nov. 15, 2018    (JP) ................................ 2018-214262

(51) Int. Cl.
*H02K 1/276*      (2022.01)
*H02K 21/14*      (2006.01)

(52) U.S. Cl.
CPC ............. *H02K 1/276* (2013.01); *H02K 21/14* (2013.01)

(58) Field of Classification Search
CPC .............................. H02K 1/276; H02K 21/14
See application file for complete search history.

(56) References Cited

U.S. PATENT DOCUMENTS

| | | | |
|---|---|---|---|
| 7,843,100 B2 * | 11/2010 | Blissenbach | H02K 1/2766 310/156.43 |
| 8,917,005 B2 * | 12/2014 | Rahman | H02K 1/2766 310/156.53 |

(Continued)

FOREIGN PATENT DOCUMENTS

| | | | |
|---|---|---|---|
| JP | 2009-296685 A | | 12/2009 |
| JP | 2009296685 A | * | 12/2009 |
| JP | 2013-81302 A | | 5/2013 |

OTHER PUBLICATIONS

European Search Report of corresponding EP Application No. 19 88 5647.8 dated Jun. 3, 2022.

(Continued)

*Primary Examiner* — Robert W Horn
(74) *Attorney, Agent, or Firm* — Global IP Counselors, LLP

(57) ABSTRACT

A rotor includes a core and two or more ribs. The core has a through hole group that includes three or more through holes arranged in a circumferential direction. The through hole group is formed through a predetermined magnetic pole. The two or more ribs are configured as portions of the core, with each rib being interposed between adjacent through holes. A first of the ribs has a first inclination with respect to a magnetic pole centerline. A second of the ribs has a second inclination with respect to the magnetic pole centerline. The second inclination is larger than the first inclination. The magnetic pole centerline is a straight line that passes through a radial center line of the magnetic pole and an axial center of the rotor. The first rib is narrower than the second rib.

20 Claims, 4 Drawing Sheets

(56) References Cited

U.S. PATENT DOCUMENTS

| | | | |
|---|---|---|---|
| 2013/0147303 A1* | 6/2013 | Kaiser | H02K 1/2766 310/156.38 |
| 2014/0217859 A1 | 8/2014 | Saito et al. | |
| 2017/0317540 A1* | 11/2017 | Laldin | H02K 1/2706 |

OTHER PUBLICATIONS

International Preliminary Report of corresponding PCT Application No. PCT/JP2019/043394 dated May 27, 2021.
International Search Report of corresponding PCT Application No. PCT/JP2019/043394 dated Jan. 28, 2020.

* cited by examiner

ROTOR, AND ROTARY ELECTRIC MACHINE PROVIDED WITH SAME

CROSS-REFERENCE TO RELATED APPLICATIONS

This is a continuation of International Application No. PCT/JP2019/043394 filed on Nov. 6, 2019, which claims priority to Japanese Patent Application No. 2018-214262, filed on Nov. 15, 2018. The entire disclosures of these applications are incorporated by reference herein.

BACKGROUND

Field of Invention

The present disclosure relates to a rotor and a dynamo-electric machine including the same.

Background Information

A rotor that includes a core having a through hole group including a plurality of through holes has been known in the art (for example, Patent Document 1). A core of a rotor of Japanese Unexamined Patent Publication No. 2009-296685 includes ribs each interposed between associated adjacent ones of the through holes. The widths of the ribs are substantially equal to one another.

SUMMARY

A first aspect of the present disclosure is directed to a rotor including a core and two or more ribs. The core has a through hole group that includes three or more through holes arranged in a circumferential direction. The through hole group is formed through a predetermined magnetic pole. The two or more ribs are configured as portions of the core, with each of the two or more ribs being interposed between associated adjacent ones of the through holes. A first of the two or more ribs has a first inclination with respect to a magnetic pole centerline. A second of the one of the ribs has a second inclination with respect to the magnetic pole centerline. The second inclination is larger than the first inclination. The magnetic pole centerline is a straight line that passes through a radial center line of the magnetic pole and an axial center of the rotor. The first of the two or more ribs is narrower than the second of the two or more ribs.

DETAILED DESCRIPTION OF EMBODIMENT(S)

Hereinafter, embodiments of the present disclosure will be described with reference to the drawings. The following embodiments are merely exemplary ones in nature, and are not intended to limit the scope, application, or uses of the invention.

An embodiment will be described. An electric motor (1) of this embodiment is an example of a dynamo-electric machine, and is configured as an interior permanent-magnet electric motor. The configuration of the electric motor (1) will be described.

Figure 1:
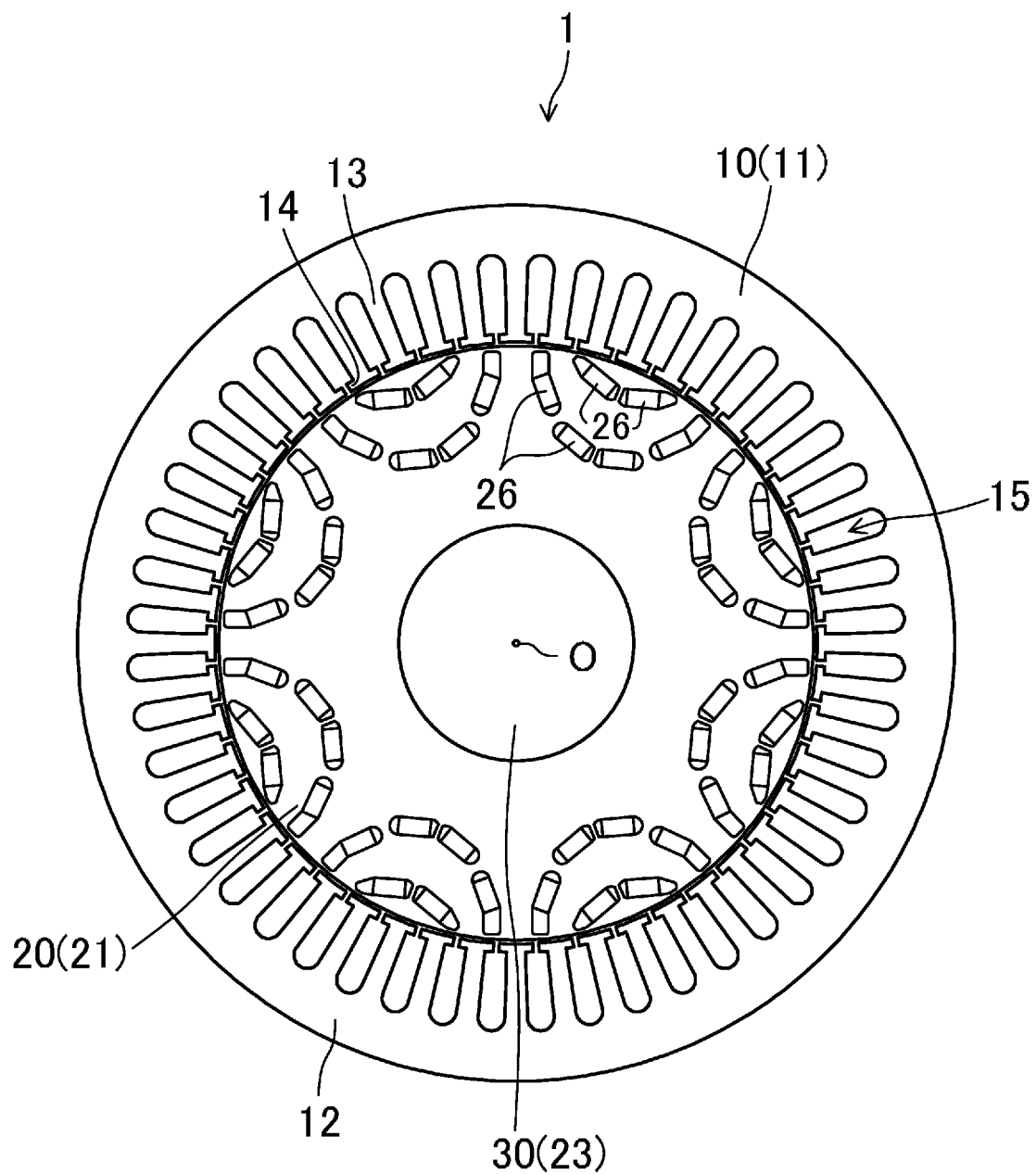
FIG. 1 is a plan view illustrating an electric motor according to an embodiment.

As illustrated in FIG. 1, the electric motor (1) includes a stator (10), a rotor (20), and a drive shaft (30). In the following description, an "axial direction" is a direction of an axial center of the drive shaft (30), and a "radial direction" is a direction orthogonal to the axial direction. An "outer peripheral" portion of a component is a portion far from the axial center, and an "inner peripheral" portion is a portion closer to the axial center.

Stator

The stator (10) includes a cylindrical stator core (11) and a coil (not shown).

The stator core (11) is formed by laminating, in the axial direction, a plurality of plate members formed by punching a magnetic steel sheet with a pressing machine. That is to say, the stator core (11) is a so-called laminated core. The stator core (11) may be configured as, for example, a dust core.

The stator core (11) includes one back yoke (12), a plurality of teeth (13), and flanges (14) equal in number to the number of the teeth (13).

The back yoke (12) is an outer peripheral portion of the stator core (11), and is annular when viewed in plane. Each of the teeth (13) is a rectangular parallelepiped-shaped portion of the stator core (11) extending in the radial direction. The coil is wound on each tooth (13) by, for example, distributed winding. A space between an adjacent pair of teeth (13) serves as a coil slot (15) for housing the coil. Thus, each of the teeth (13) serves as an electromagnet. The coil may be wound on each tooth (13) by concentrated winding.

Each of the flanges (14) is a portion extending continuously in both circumferential directions from an inner peripheral end portion of an associated one of the teeth (13). Thus, the flange (14) has a larger width (length in the circumferential direction) than the teeth (13). The flange (14) has an inner peripheral surface which is curved and faces an outer peripheral surface (cylindrical surface) of the rotor (20) with a predetermined distance (air gap) from the outer peripheral surface.

Rotor

The rotor (20) includes a rotor core (21) and a plurality of permanent magnets (26). In the rotor (20), these permanent magnets (26) form eight magnetic poles. These permanent magnets (26) all have the same shape. These permanent magnets (26) are configured as, for example, sintered magnets. In this example, the permanent magnets (26) are rare-earth magnets made of a rare-earth element. Each permanent magnet (26) passes through the rotor core (21) in the axial direction. The rotor core (21) constitutes a core.

The rotor core (21) is comprised of a plurality of core members (22) formed by punching a magnetic steel sheet of, for example, 0.1 mm to 0.5 mm in thickness, using a pressing machine, and laminated in the axial direction, and is formed in the shape of a cylinder. That is to say, the rotor core (21) is a so-called laminated core. The rotor core (21) may be configured as, for example, a high-tensile magnetic steel sheet, a silicon steel sheet having a silicon content of 6.5%, or a dust core.

The rotor core (21) has a shaft hole (23) in the center. The drive shaft (30) for driving a load (e.g., a rotary compressor of an air conditioner) is tightly fitted (e.g., shrink fitted) in the shaft hole (23). Thus, the axial center (O) of the rotor core (21) (i.e., the axial center (O) of the rotor (20)) is coaxial with the axial center of the drive shaft (30).

The core members (22) each have a plurality of through holes (25). These through holes (25) serve as magnet slots respectively accommodating the permanent magnets (26). As can be seen from FIG. 1, the shape of each through hole (25) is determined such that a void is formed as necessary with an associated one of the permanent magnets (26) inserted into the through hole (25).

Figure 2:
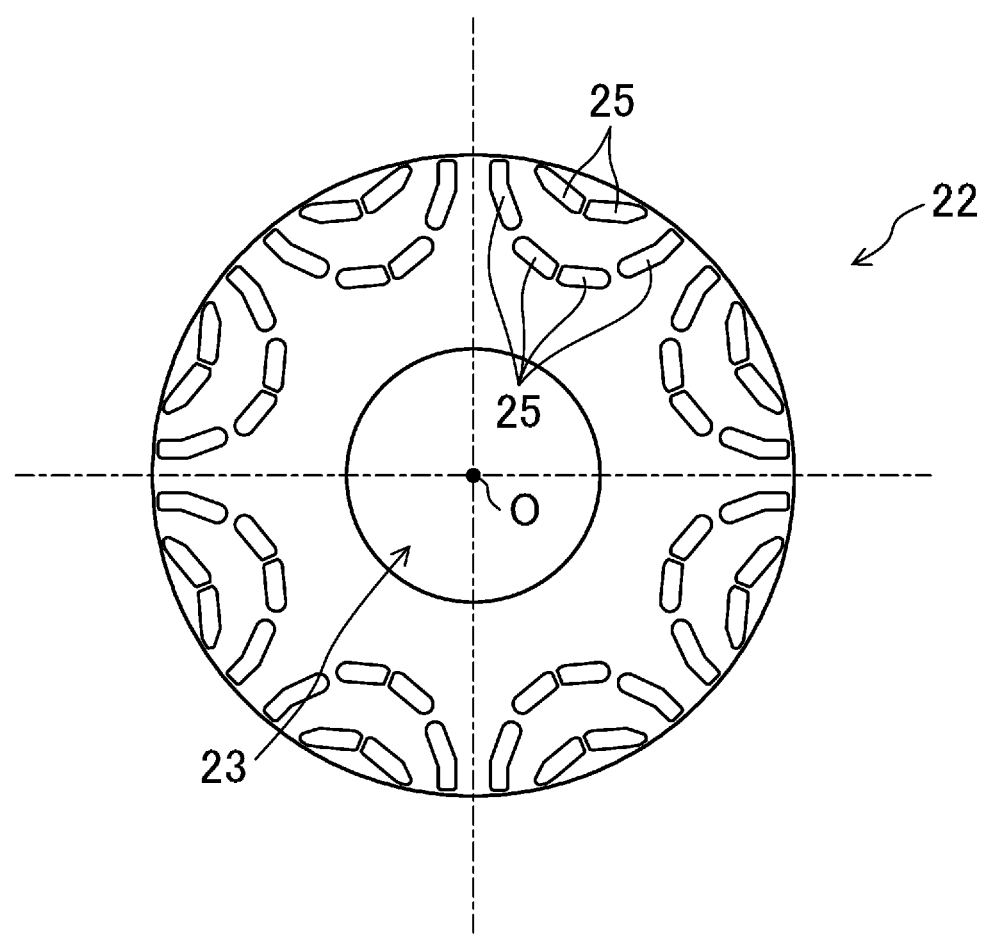
FIG. 2 is a plan view illustrating a core member forming part of a rotor.
Figure 3:
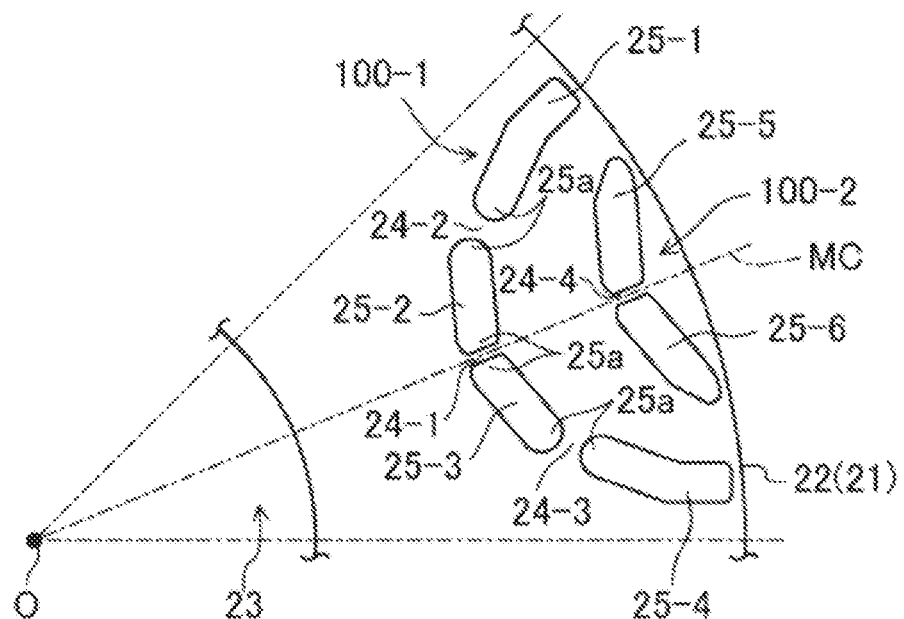
FIG. 3 is a partial plan view illustrating through hole groups corresponding to one of magnetic poles of the rotor.

As illustrated in FIGS. 2 and 3, each of the core members (22) has a plurality of rows (in this example, two rows) of through hole groups (100) provided for each magnetic pole and arranged in the radial direction. Each of the through hole groups (100) includes a plurality of through holes (25) arranged in the circumferential direction. Each of the rows of the through hole groups (100) is in the shape of an arc protruding toward the axial center (O) of the rotor (20). In FIG. 3, appropriate suffix numerals are appended to the ends of the reference characters to distinguish the through holes (25) and the through hole groups (100) from one another (e.g., 25-1, 25-2, and 100-1).

As illustrated in FIG. 3, each magnetic pole has two through hole groups (100) ((also referred to as "two rows of through hole groups (100)"). An outer peripheral one (100-2) of the rows of the through hole groups includes two through holes (25-5, 25-6). An inner peripheral one (100-1) of the rows of the through hole groups includes four through holes (25-1, 25-2, 25-3, 25-4). The four through holes (25-1, 25-2, 25-3, 25-4) forming the inner peripheral one (100-1) of the rows of the through hole groups are arranged symmetrically with respect to a magnetic pole centerline (MC) that is a straight line passing through the radial center line of the magnetic pole and the axial center (O) of the rotor (20).

Each core member (22) includes ribs (24) each formed between two opposed ones of the through holes (25) of an associated one of the through hole groups (100). Here, in order to reduce magnetic flux leakage through each rib (24) (i.e., generation of magnetic flux that does not contribute to torque generation), it is recommended that the rib (24) be as narrow as possible. On the other hand, in order that each rib (24) can be strong enough to withstand the centrifugal force acting on the rotor core (21) during operation of the electric motor (1), it is recommended that the rib (24) be as wide as possible.

In this embodiment, consideration is given to the configuration and other elements of each rib (24) so that while the rib (24) is as narrow as possible, the rib (24) is strong enough. This will now be described.

As illustrated in FIG. 3, ribs (24-1, 24-2, 24-3) each exist between associated adjacent ones of the four through holes (25-1, 25-2, 25-3, 25-4) forming the inner peripheral one (100-1) of the rows of the through hole groups of each of the core members (22). These three ribs (24-1, 24-2, 24-3) include one central rib (24-1) and two distant ribs (24-2, 24-3).

The central rib (24-1) is located on the magnetic pole centerline (MC). The central rib (24-1) extends parallel to the magnetic pole centerline (MC). The central rib (24-1) is narrower than the distant ribs (24-2, 24-3). In one preferred embodiment, the width of the central rib (24-1) is about ½ to ⅕ of the width of each of the distant ribs (24-2, 24-3). It is recommended that the central rib (24-1) of the core member (22) with an outside diameter of 128 mm have a width of about 0.5 mm to 1.5 mm, and the distant ribs (24-2, 24-3) each have a width of about 1.5 mm to 5.0 mm, for example. In one preferred embodiment, the width of the central rib (24-1) is at least twice the thickness of the core member (22). The central rib (24-1) constitutes a rib having a relatively small inclination (θ1) (i.e., substantially 0°) with respect to the magnetic pole centerline (MC), and constitutes a parallel rib. The central rib (24-1) further constitutes a proximal rib.

Each of the distant ribs (24-2, 24-3) is located apart from the magnetic pole centerline (MC). In other words, the distances (L2, L3) from the distant ribs (24-2, 24-3) to the magnetic pole centerline (MC) in the circumferential direction are longer than the distance (L1) from the central rib (24-1) to the same centerline (i.e., substantially zero). The two distant ribs (24-2, 24-3) are symmetrical to each other with respect to the magnetic pole centerline (MC). Each distant rib (24-3, 24-3) extends while being inclined with respect to the magnetic pole centerline (MC). In other words, the inclination (θ2, θ3) of each distant rib (24-2, 24-3) with respect to the magnetic pole centerline (MC) is larger than the inclination (θ1) of the central rib (24-1) with respect to the same centerline. The distant rib (24-2, 24-3) constitutes a rib having a relatively large inclination (θ2, θ3) with respect to the magnetic pole centerline (MC), and constitutes an inclined rib.

The through holes (25) of the inner peripheral one (100-1) of the rows of the through hole groups of the core member (22) each have a portion or portions adjacent to the associated rib(s) (24). These portions are referred to as the "rib-adjacent portions (25a)." The rib-adjacent portions (25a) of the through holes (25) are rounded. The radius (R1) of curvature of the rounded central rib (24-1) is smaller than the radius (R2, R3) of curvature of each of the rounded distant ribs (24-2, 24-3).

In contrast, a rib (24-4) exists between the two through holes (25-5, 25-6) forming the outer peripheral one (100-2) of the rows of the through hole groups. The rib (24-4) is located on the magnetic pole centerline (MC). In one preferred embodiment, the rib (24-4) is narrower than the central rib (24-1). In one preferred embodiment, the width of the rib (24-4) is at least twice the thickness of the core member (22).

If the rotor core (21) is comprised of the many core members (22) each formed by punching the magnetic steel sheet, and laminated in the axial direction, the magnetic steel sheets each satisfying the foregoing features would also provide similar advantages.

Advantages of Embodiment

The rotor (20) of this embodiment includes the rotor core (21) having the magnetic poles each having the through hole group (100-1) including the four through holes (25) arranged in the circumferential direction, and further includes the three ribs (24) configured as portions of the rotor core (21) and each located between associated adjacent ones of the through holes (25). One of the ribs (24) having a relatively small inclination (θ) with respect to the magnetic pole centerline (MC) that is the straight line passing through the radial center line of the associated magnetic pole and the axial center (O) of the rotor (20) is narrower than the other ribs (24) having a relatively large inclination (θ) with respect to the magnetic pole centerline (MC).

Here, the present inventors have discovered that the centrifugal force acting on a portion of a predetermined magnetic pole located radially outward of the through hole group (100) acts on the ribs (24) in the magnetic pole in a direction substantially parallel to the magnetic pole centerline (MC), and that as the inclination (θ) of each rib (24) with respect to the magnetic pole centerline (MC) decreases, the force acting on the rib (24) in a bending direction due to the centrifugal force is reduced. The present inventors have further discovered that the smaller the force acting on the rib (24) in the bending direction is, the narrower the rib (24) may be designed to be, and the narrower rib (24) has no problem in strength design.

Thus, in this embodiment, in each of the magnetic poles, a rib (24) having a relatively small inclination (θ) with respect to the magnetic pole centerline (MC) is designed to be narrower than a rib (24) having a relatively large inclination (θ) with respect to the magnetic pole centerline (MC). This is because the force acting on the former rib (24) in the bending direction due to the centrifugal force is smaller than the same force acting on the latter rib (24), and the former rib (24) designed to be narrower would not have any problem in strength design. Designing the predetermined rib (24) to be as narrow as possible as described above allows the dimensions of the ribs (24) of the rotor (20) to be optimally adjusted to necessary and sufficient dimensions.

In addition, according to this embodiment, the width of each rib (24) of the rotor (20) is set to be necessary and sufficient. This can improve the magnetic properties of the rotor (20). This is because, while, as the width of each rib (24) increases, the magnetic flux leakage through the rib (24) (i.e., generation of magnetic flux that does not contribute to torque generation) increases, such magnetic flux leakage can be reduced. In other words, according to this embodiment, both the strength design and magnetic design of the ribs (24) of the rotor (20) can be optimized.

The three ribs (24) of the rotor (20) of this embodiment include the proximal rib (24-1) apart from the magnetic pole centerline (MC) in the circumferential direction by a relatively short distance (L), and the distant ribs (24-2, 24-3) apart from the magnetic pole centerline (MC) in the circumferential direction by a relatively long distance (L). The proximal rib (24-1) has an inclination (θ1) that is smaller than the inclination (θ2, θ3) of each of the distant ribs (24-2, 24-3) with respect to the magnetic pole centerline (MC), and is narrower than each of the distant ribs (24-2, 24-3). Thus, the proximal rib (24-1) having a relatively small inclination (θ1) with respect to the magnetic pole centerline (MC) is designed to be narrower than each of the distant ribs (24-2, 24-3) having a relatively large inclination (θ2, θ3) with respect to the magnetic pole centerline (MC). In other words, the proximal rib (24-1) on which a relatively small force acts in the bending direction due to the centrifugal force is designed to be narrower than the distant ribs (24-2, 24-3) on each of which a relatively large force acts in the same bending direction. This allows the dimensions of the proximal rib (24-1) and the distant ribs (24-2, 24-3) to be optimally adjusted to necessary and sufficient dimensions.

In the rotor (20) of this embodiment, the rib-adjacent portions (25a) that are portions of the through holes (25) adjacent to the associated ribs (24) are rounded. The radius (R) of curvature of the rounded rib-adjacent portion (25a) adjacent to one of the ribs (24) having a relatively small inclination (θ) with respect to the magnetic pole centerline (MC) is smaller than the radius (R) of curvature of the rounded rib-adjacent portion (25a) adjacent to each of the other ribs (24) having a relatively large inclination (θ) with respect to the magnetic pole centerline (MC). Thus, one of the ribs (24) having a relatively small inclination (θ) with respect to the magnetic pole centerline (MC) is designed to be narrower than each of the other ribs (24) having a relatively large inclination (θ) with respect to the magnetic pole centerline (MC). In addition, a large portion of the one of the ribs (24) in the longitudinal direction along the centerline (CL) thereof is designed to be narrow. This is because, while portions of the ribs (24) adjacent to rounded portions of the associated rib-adjacent portions (25a) are wider than the other portions, such a wider portion of the former rib (24) has a smaller area than that of each of the latter ribs (24). This can further optimize the dimensions of the former rib (24) on which a relatively small force acts in the bending direction.

The through hole group (100) of the rotor (20) of this embodiment includes the four through holes (25) arranged substantially symmetrically with respect to the magnetic pole centerline (MC), and the three ribs (24) include the central rib (24-1) located on the magnetic pole centerline (MC). Thus, the material point of a radially outer portion of the through hole group (100) is located on the centerline (CL) of the central rib (24-1) (i.e., on the magnetic pole centerline (MC)). This extremely reduces the force acting on the central rib (24-1) in the bending direction due to the centrifugal force applied to the material point. This allows the central rib (24-1) to be narrower than if the central rib (24-1) is configured as a portion of the rotor (20) except a portion thereof located on the magnetic pole centerline (MC). As a result, the magnetic flux leakage through the central rib (24-1) can be reduced.

The three ribs (24) of the rotor (20) of this embodiment include the parallel rib (24-1) extending substantially parallel to the magnetic pole centerline (MC), and the inclined ribs (24-2, 24-3) extending while being inclined with respect to the magnetic pole centerline (MC). The parallel rib (24-1) is narrower than each of the inclined ribs (24-2, 24-3). Thus, the parallel rib (24-1) having a relatively and remarkably small inclination (θ1) with respect to the magnetic pole centerline (MC) is designed to be narrower than each of the inclined ribs (24-2, 24-3) having a relatively large inclination (θ2, θ3) with respect to the magnetic pole centerline (MC). This is because the force acting on the parallel rib (24-1) in the bending direction due to the centrifugal force is smaller than the same force acting on each of the inclined ribs (24-2, 24-3). Such dimensional design allows the dimensions of the parallel rib (24-1) and the inclined ribs (24-2, 24-3) to be optimally adjusted to necessary and sufficient dimensions.

The four through holes (25) of the rotor (20) of this embodiment each include the permanent magnet (26). Thus, the magnetic flux of the permanent magnet (26) can be efficiently used. This is because each of the ribs (24) is designed to have a minimum necessary width in strength design, and the magnetic flux of the permanent magnet (26) is thus less likely to be shorted via the rib (24) within the rotor (20).

In addition, the electric motor (1) of this embodiment includes the rotor (20) of this embodiment and the stator (10) provided radially outward of the rotor (20). Thus, the electric motor (1) is an inner-rotor electric motor. The ribs (24) of the rotor (20) of the electric motor (1) are designed to have necessary and sufficient dimensions in strength design. Thus, even if the electric motor (1) is driven to rotate at high speed (e.g., a speed higher than or equal to 10,000 to 15,000 rpm), the centrifugal force is less likely to cause the rotor (20) to be broken.

OTHER EMBODIMENTS

The foregoing embodiment may be modified as follows.

For example, only some of the through holes (25) of the rotor (20) may include the permanent magnet (26). Alternatively, no permanent magnet (26) needs to be provided. In the latter case, the rotor (20) constitutes a rotor for a reluctance motor.

For example, the configuration of the rotor (20) described in each of the foregoing embodiments can also be used in a generator (an example of a dynamo-electric machine).

For example, only some of the magnetic poles of the rotor (20) may be configured as illustrated in FIG. 3. In one preferred embodiment, all of the magnetic poles of the rotor (20) are configured as illustrated in FIG. 3.

Figure 4:
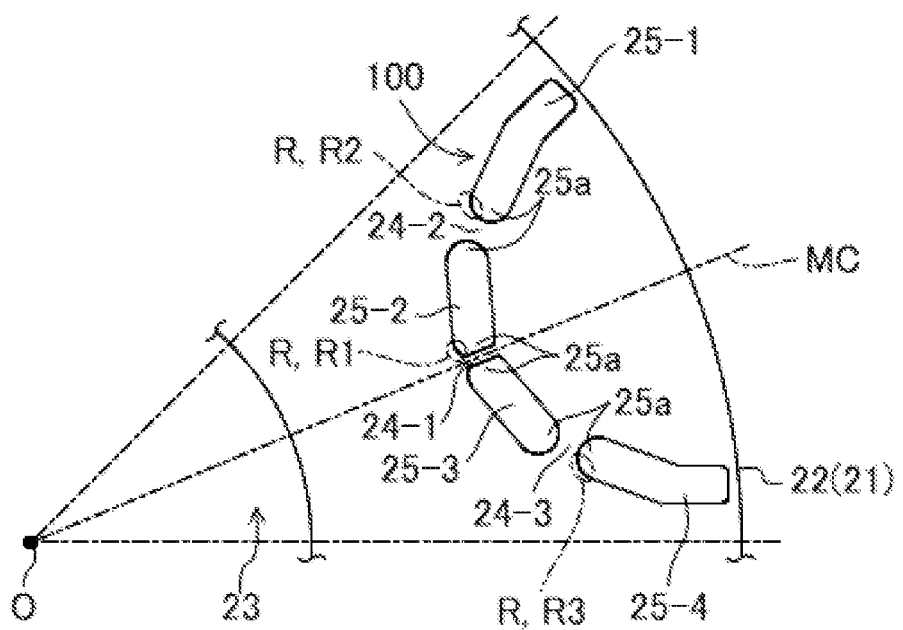
FIG. 4 is a partial plan view illustrating a through hole group corresponding to one of magnetic poles of a rotor according to another embodiment.
Figure 5:
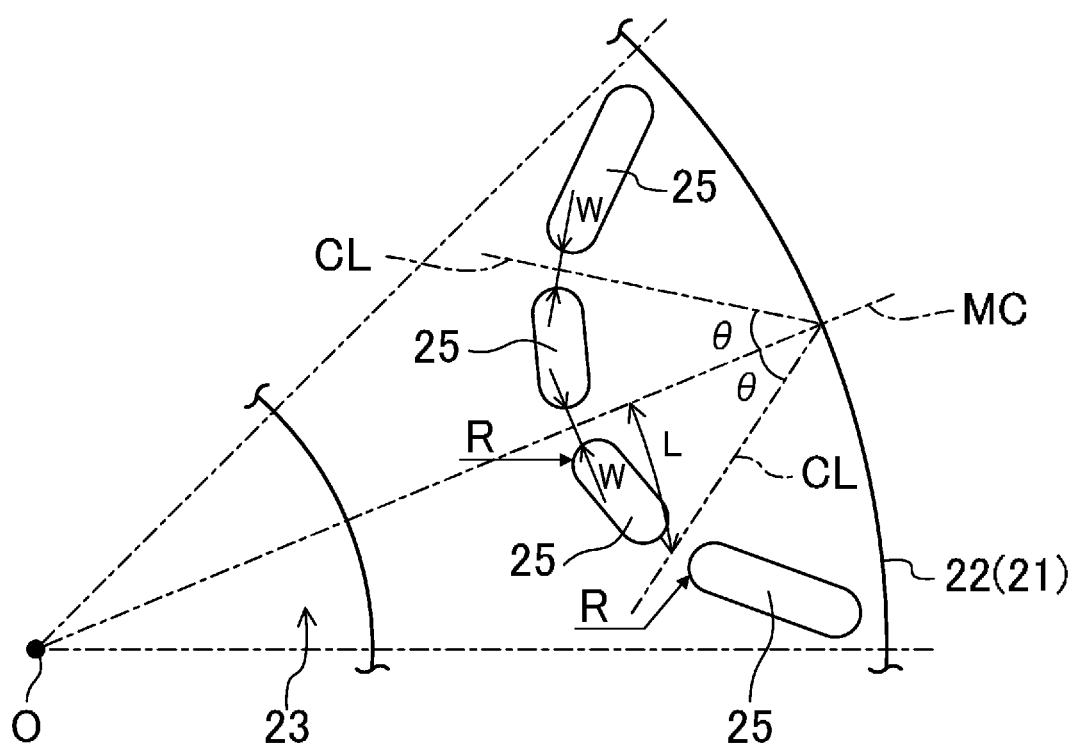
FIG. 5 is a schematic view for explaining dimensions and other elements associated with through holes and ribs.

For example, the number of the rows of the through hole groups (100) of each magnetic pole of the rotor (20) may be one (see FIG. 4), or may be three or more.

For example, each of the through hole groups (100) of the rotor (20) may be skewed. In this case, the technology of this application may be used on the basis of the magnetic poles of the rotor core (21), on the basis of the magnetic poles of each of the core members (22), or on the basis of the magnetic poles of an optional cross section of the rotor core (21).

In addition, for example, the rotor core (21) of the rotor (20) may be formed by optionally combining core members shaped such that two upper ones (25-1, 25-2) of the through holes of the inner peripheral one (100-1) of the rows of the through hole groups in FIG. 3 are connected together, and core members shaped such that two lower ones (25-3, 25-4) of the through holes of the same through hole group (100-1) are connected together, and for example, alternately laminating such combinations.

For example, the through holes (25) forming each of the through hole groups (100) may be arranged asymmetrically with respect to the magnetic pole centerline (MC).

For example, the number of the through holes (25) forming each of the through hole groups (100) may be odd.

For example, the rib-adjacent portions (25a) of the through holes (25) of the rotor (20) do not have to be rounded, and may be linearly chamfered instead of being rounded. In such a case, the chamfer dimensions can be optionally set.

While the embodiments and variations thereof have been described above, it will be understood that various changes in form and details may be made without departing from the spirit and scope of the claims. The foregoing embodiments and variations thereof may be combined and replaced with each other without deteriorating the intended functions of the present disclosure.

As can be seen from the foregoing description, the present disclosure is useful for a rotor and a dynamo-electric machine including the same.

The invention claimed is:

1. A rotor comprising:
a core having a through hole group including three or more through holes arranged in a circumferential direction, the through hole group being formed through a predetermined magnetic pole; and
two or more ribs configured as portions of the core, each of the two or more ribs being interposed between associated adjacent ones of the through holes included in the through hole group,
the three or more through holes being arranged in a shape of an arc protruding toward an axial center of the rotor,
the two or more ribs including at least two ribs having respective inclinations with respect to a magnetic pole centerline that are different from each other, the at least two ribs including a first rib having a first inclination with respect to the magnetic pole centerline and a second rib having a second inclination with respect to the magnetic pole centerline, the second inclination being larger than the first inclination, the magnetic pole centerline being a straight line that passes through a radial center line of the magnetic pole and an axial center of the rotor,
the first rib being narrower than the second rib, and
an inclination of an arbitrary rib, which is any one of the two or more ribs, with respect to the magnetic pole centerline representing an angle formed between the magnetic centerline and a straight line connecting an arbitrary point on the magnetic pole centerline to a center of the arbitrary rib,
the inclination being smaller as a direction in which the arbitrary rib extends approaches a direction parallel to the magnetic pole centerline.

2. The rotor of claim 1, wherein
the two or more ribs include
a proximal rib apart from the magnetic pole centerline in the circumferential direction by a first distance, and
a distant rib apart from the magnetic pole centerline in the circumferential direction by a second distance,
the second distance being larger than the first distance,
an inclination of the proximal rib with respect to the magnetic pole centerline is smaller than an inclination of the distant rib with respect to the magnetic pole centerline, and
the proximal rib is narrower than the distant rib.

3. The rotor of claim 1, wherein
a rib-adjacent portion of each of the through holes adjacent to an associated one of the ribs is rounded, and
a first radius of curvature of rounding of one of the rib-adjacent portions adjacent to the first rib is smaller than a second radius of curvature of rounding of another one of the rib-adjacent portions adjacent to the second rib.

4. The rotor of claim 2, wherein
a rib-adjacent portion of each of the through holes adjacent to an associated one of the ribs is rounded, and
a first radius of curvature of rounding of one of the rib-adjacent portions adjacent to the first rib is smaller than a second radius of curvature of rounding of another one of the rib-adjacent portions adjacent to the second rib.

5. The rotor of claim 1, wherein
the through hole group includes four or more even-numbered through holes, the through holes being arranged substantially symmetrically with respect to the magnetic pole centerline, and
the two or more ribs include a central rib located on the magnetic pole centerline.

6. The rotor of claim 2, wherein
the through hole group includes four or more even-numbered through holes, the through holes being arranged substantially symmetrically with respect to the magnetic pole centerline, and
the two or more ribs include a central rib located on the magnetic pole centerline.

7. The rotor of claim 3, wherein
the through hole group includes four or more even-numbered through holes, the through holes being arranged substantially symmetrically with respect to the magnetic pole centerline, and the two or more ribs include a central rib located on the magnetic pole centerline.

8. The rotor of claim 4, wherein the through hole group includes four or more even-numbered through holes, the through holes being arranged substantially symmetrically with respect to the magnetic pole centerline, and the two or more ribs include a central rib located on the magnetic pole centerline.

9. The rotor of claim 1, wherein the two or more ribs include a parallel rib extending in a direction substantially parallel to the magnetic pole centerline, and an inclined rib extending in a direction inclined with respect to the magnetic pole centerline, and the parallel rib is narrower than the inclined rib.

10. The rotor of claim 1, wherein at least a portion of each of the three or more through holes includes a permanent magnet.

11. A dynamo-electric machine comprising:

a rotor including a core having a through hole group including three or more through holes arranged in a circumferential direction, the through hole group being formed through a predetermined magnetic pole, and two or more ribs configured as portions of the core, each of the two or more ribs being interposed between associated adjacent ones of the through holes included in the through hole group; and a stator provided radially outward of the rotor, the three or more through holes being arranged in a shape of an arc protruding toward an axial center of the rotor, the two or more ribs including at least two ribs having respective inclinations with respect to a magnetic pole centerline that are different from each other, the at least two ribs including a first rib having a first inclination with respect to the magnetic pole centerline and a second rib having a second inclination with respect to the magnetic pole centerline, the second inclination being larger than the first inclination, the magnetic pole centerline being a straight line that passes through a radial center line of the magnetic pole and an axial center of the rotor, the first rib being narrower than the second rib, and an inclination of an arbitrary rib, which is any one of the two or more ribs, with respect to the magnetic pole centerline representing an angle formed between the magnetic centerline and a straight line connecting an arbitrary point on the magnetic pole centerline to a center of the arbitrary rib, the inclination being smaller as a direction in which the arbitrary rib extends approaches a direction parallel to the magnetic pole centerline.

12. The dynamo-electric machine of claim 11, wherein the two or more ribs include a proximal rib apart from the magnetic pole centerline in the circumferential direction by a first distance, and a distant rib apart from the magnetic pole centerline in the circumferential direction by a second distance, the second distance being larger than the first distance, an inclination of the proximal rib with respect to the magnetic pole centerline is smaller than an inclination of the distant rib with respect to the magnetic pole centerline, and the proximal rib is narrower than the distant rib.

13. The dynamo-electric machine of claim 11, wherein a rib-adjacent portion of each of the through holes adjacent to an associated one of the ribs is rounded, and a first radius of curvature of rounding of one of the rib-adjacent portions adjacent to the first rib is smaller than a second radius of curvature of rounding of another one of the rib-adjacent portions adjacent to the second rib.

14. The dynamo-electric machine of claim 12, wherein a rib-adjacent portion of each of the through holes adjacent to an associated one of the ribs is rounded, and a first radius of curvature of rounding of one of the rib-adjacent portions adjacent to the first rib is smaller than a second radius of curvature of rounding of another one of the rib-adjacent portions adjacent to the second rib.

15. The dynamo-electric machine of claim 11, wherein the through hole group includes four or more even-numbered through holes, the through holes being arranged substantially symmetrically with respect to the magnetic pole centerline, and the two or more ribs include a central rib located on the magnetic pole centerline.

16. The dynamo-electric machine of claim 12, wherein the through hole group includes four or more even-numbered through holes, the through holes being arranged substantially symmetrically with respect to the magnetic pole centerline, and the two or more ribs include a central rib located on the magnetic pole centerline.

17. The dynamo-electric machine of claim 13, wherein the through hole group includes four or more even-numbered through holes, the through holes being arranged substantially symmetrically with respect to the magnetic pole centerline, and the two or more ribs include a central rib located on the magnetic pole centerline.

18. The dynamo-electric machine of claim 14, wherein the through hole group includes four or more even-numbered through holes, the through holes being arranged substantially symmetrically with respect to the magnetic pole centerline, and the two or more ribs include a central rib located on the magnetic pole centerline.

19. The dynamo-electric machine of claim 11, wherein the two or more ribs include a parallel rib extending in a direction substantially parallel to the magnetic pole centerline, and an inclined rib extending in a direction inclined with respect to the magnetic pole centerline, and the parallel rib is narrower than the inclined rib.

20. The dynamo-electric machine of claim 11, wherein at least a portion of each of the three or more through holes includes a permanent magnet.

* * * * *